US009251487B2

(12) United States Patent
Black et al.

(10) Patent No.: US 9,251,487 B2
(45) Date of Patent: Feb. 2, 2016

(54) SYSTEM AND METHOD FOR COMPUTING AND OVERWRITING THE APPEARANCE OF PROJECT TASKS AND MILESTONES

(71) Applicants: Safford T Black, Highlands Ranch, CO (US); James L Black, Centennial, CO (US)

(72) Inventors: Safford T Black, Highlands Ranch, CO (US); James L Black, Centennial, CO (US)

(*) Notice: Subject to any disclaimer, the term of this patent is extended or adjusted under 35 U.S.C. 154(b) by 300 days.

(21) Appl. No.: 13/912,130

(22) Filed: Jun. 6, 2013

(65) Prior Publication Data

US 2014/0365938 A1     Dec. 11, 2014

(51) Int. Cl.
  *G06Q 10/06*     (2012.01)
  *G06F 3/0484*     (2013.01)
  *G06Q 10/10*     (2012.01)

(52) U.S. Cl.
  CPC ........ *G06Q 10/06316* (2013.01); *G06F 3/0484* (2013.01); *G06Q 10/06* (2013.01); *G06Q 10/1097* (2013.01)

(58) Field of Classification Search
  CPC ............ G06Q 10/109; G06Q 10/1093; G06Q 10/1097; G06Q 10/06311; G06Q 10/063118; G06Q 10/06313; G06Q 10/06316

USPC ......... 715/772, 963, 248, 273, 275, 825, 866; 705/7.13, 7.17, 7.23, 7.26

See application file for complete search history.

(56) References Cited

U.S. PATENT DOCUMENTS

| | | | |
|---|---|---|---|
| 7,999,810 B1* | 8/2011 | Boice et al. | 345/473 |
| 2009/0043802 A1* | 2/2009 | Appel | 707/102 |
| 2012/0047421 A1* | 2/2012 | Holman | 715/202 |
| 2012/0079408 A1* | 3/2012 | Rohwer | 715/772 |

* cited by examiner

*Primary Examiner* — John Villecco

(57) ABSTRACT

A computer-implemented system that transforms one or more project plans to create a graphical project view. The appearance of the project view is determined by a default style, one or more style rules applied to each task or milestone in the chart, or both. Once the project view has been created, users may alter its appearance by changing the default style settings, modifying the data-driven style rules, or by manually changing the appearance of selected tasks and milestones to deviate from the default style or style rules. As project plans are updated, the project view may be refreshed to create a new snapshot, or to replace an existing snapshot. As data is refreshed, the system will preserve manual style changes, and will also reapply style rules, which may result in a change to the project view's appearance. Snapshots may have different appearances, based on rules and manual changes.

12 Claims, 24 Drawing Sheets

US 9,251,487 B2

SYSTEM AND METHOD FOR COMPUTING AND OVERWRITING THE APPEARANCE OF PROJECT TASKS AND MILESTONES

BACKGROUND OF THE INVENTION (a) Field of the Invention

This invention pertains to a computer-implemented system that creates visual project reports where sets of tasks and milestones can be assigned graphical formatting based on default styles, or based on rules that test task or milestone data attributes.

(b) Discussion of Prior Art

Project management is as much about communication as it is execution, but projects by their very nature are complex, which makes it difficult to effectively communicate the big picture to stakeholders or executives.

Commercially-available project management software such as MICROSOFT® Project or ORACLE® PRIMAVERA® P6® focus on the management of project details, but do a rudimentary job of creating visual reports that are concise and are easy for laypeople to understand. Reporting out of these project management software applications has little ability to apply meaningful sets of data-driven shapes, colors, border formats, sizes, and fonts that would improve the quality of project communications. Lack of such stylistic control impairs the project manager's ability to convey consistent meaning to project stakeholders.

As a result, project managers often revert to drawing tools such as VISIO® diagrams or POWERPOINT® presentations to manually illustrate their project data in a more flexible and visually-meaningful format. These charts are often rich in graphical formatting and therefore easier to understand, but they are created by manually editing shapes and therefore lack the capability to apply a style or set of styles to a project report in an automated fashion. Furthermore, projects change with time, and manually-created formatting affords no way to automatically update the task dates and progress while preserving the formatting. Finally, projects often exist in the context of a portfolio of related projects and yet manual formatting affords no way to enforce consistency from one project to the next.

This problem has been addressed in other fields through the use of rules-based formatting ("conditional formatting"), which is well-known in the financial sector when determining the style of cells in an EXCEL® spreadsheet (U.S. Pat. No. 7,634,717 B2). Cells in an HTML table can also be formatted based on a set of rules (U.S. Pat. No. 6,851,088 B1), however nether HTML tables nor spreadsheets provide an adequate graphical representation of a project plan, which typically contains many tasks and milestones scattered along a timeline, based on start and finish dates, among other data elements.

Rules-based formatting, while a common method in other industries, has never been applied by a project management software application without first requiring changes to project data. As a result, the process of presenting projects effectively is a tedious and time-consuming effort for any project manager who needs to summarize a project in a way that makes good use of colors, shapes, fonts, border styles, and sizes.

DRAWINGS

DETAILED DESCRIPTION OF PREFERRED EXEMPLAR EMBODIMENTS

Figure 1:
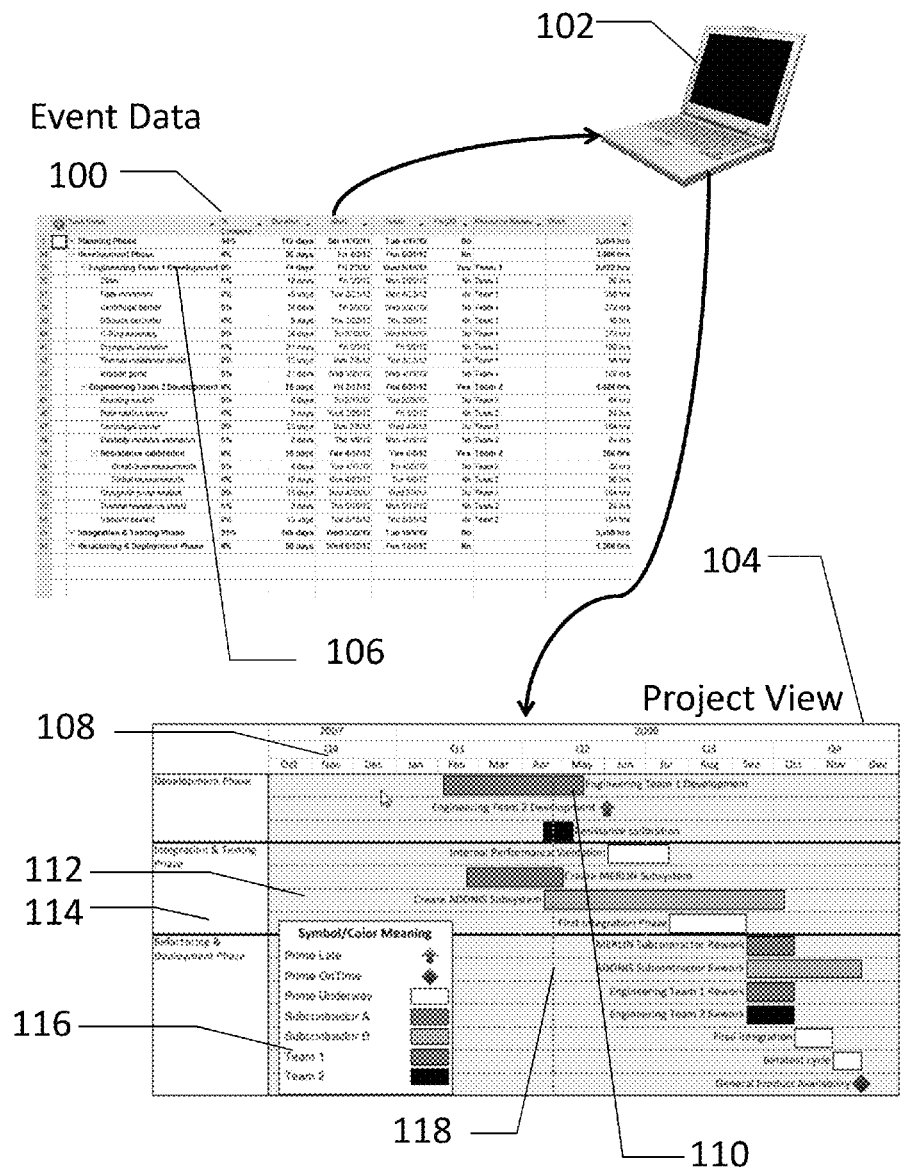
FIG. 1 shows a high-level overview of the computer-driven process, which transforms Event Data into a Project View in which Markers are displayed in rows and swimlanes along a timeline according to an embodiment of the present invention.

One embodiment of the invention, which is not intended to limit the scope of the invention, is a computer system that processes Event data from one or more project plans, renders a set of Markers in rows and swimlanes along a timeline based on the start or finish dates for each Event, and applies either a default style, or one or more style rules to each Marker in the graph. Following the initial rendering, users of the system may choose to alter the formatting of the Markers by making manual changes, modifying the default styles, modifying the style rules, updating the project data and re-applying style rules based on any changes to this data, or adding additional snapshots (versions) of the project plan and applying the same rules to the new snapshots.

GLOSSARY OF TERMS

The terms and phrases defined in this section are intended to have the meaning ascribed to them applied throughout this document including the claims unless clearly indicated otherwise explicitly or in context. Further, as applicable, the stated definitions are to apply, regardless of the word or phrase's case, to the singular and plural variations of the defined word or phrase.

Data Attribute: Elements of an Event that help define the meaning of the Event. Examples of Data Attributes include, but are not limited to start date, finish date, resource assignment, percent complete, assigned phase, cost, and status. Data Attributes can be constant across all Snapshots (Event Data Attributes), or can vary across Snapshots (Snapshot-Event Data Attributes). Both Event Data Attributes and Snapshot-Event Data Attributes are collectively called Data Attributes.

Default Style Settings: Defines the default Graphical Attributes for a Project View. These style settings are independent of the Data Attributes.

Drawing Engine: software that applies Graphical Attributes to Markers in a Project View.

Event: a task or milestone in a project plan.

Event Data: a non-transient data store containing one or more Events. Examples of Event Data include, but are not limited to project plans in the memory of a computer in an application such as Microsoft Project.

Graphical Attribute: a visual property of a Marker including but not limited to color, shape, size, border style, fill pattern, or font style.

Marker: the symbol employed to represent an Event in a Project View. For example, Events may be represented by colored rectangles, diamonds, or other symbols. The horizontal coordinates of a Marker relative to the Timeline convey the Start Time and/or End Time of the Event that the Marker represents.

Maverick: a Marker wherein at least one Graphical Attribute has been set manually by the user, and therefore does not comply with either Default Style Settings or a Style Rule. Graphical Attributes of a Marker can be said to be "Mavericked" if they meet these criteria.

Maverick Engine: software that computes Graphical Attributes for a Marker in cases where some Graphical Attributes for some markers have been manually modified.

Project View: a collection of Markers, combined with a Timeline, and various display settings to present the occurrence of Events. A Project View can contain one or more projects and can contain one or more Snapshots, but shall not be limited in scope to contain multiple projects, or to contain Snapshots.

Snapshot: A version of a project plan containing the Data Attributes on a specific date or the Data Attributes for a specific "what-if" scenario.

Row: a rectangular area on the computer screen whose width includes the entire width extent of the Timeline and which contains one or more Markers. Each Row constrains the vertical position of the markers it contains to be between the Row's top and bottom edges.

Style Rule: tests a condition on a Data Attribute of an Event. When the condition is true, the Graphical Attribute or set of Graphical Attributes specified in the rule are applied to the Event. Style Rules may test a plurality of types of conditions, or logical combinations of such conditions, including but not limited to: numeric conditions (e.g. Data Attribute>10), date conditions (e.g. Data Attribute<Jan. 1, 2013), string conditions (e.g. Data Attribute contains "High"), and Boolean conditions (e.g. Data Attribute is true).

Style Rule Engine: software that evaluates Style Rules and computes Graphical Attributes for Markers.

Swimlane: a rectangular area on the computer screen whose width includes the entire width extent of the Timeline and which contains one or more vertically adjacent Rows. A Swimlane thus contains one or more Markers whose vertical position is constrained to be between the Swimlane's top and bottom edges.

Template: A collection of settings, which cause Graphical Attributes to be automatically applied to Markers in a Project View. A Template may include both Default Styles and Style Rules. Templates are not tied to Event Data, and may be used to create comparable Graphical Attributes across multiple Project Views.

Timeline: a graphical representation of a time scale showing units of time that serve as reference points for the progression of Events in a project plan. Timelines may indicate successive years, quarters, months, weeks, days, hours, minutes, or seconds.

DESCRIPTION AND OPERATION

Figure 22:
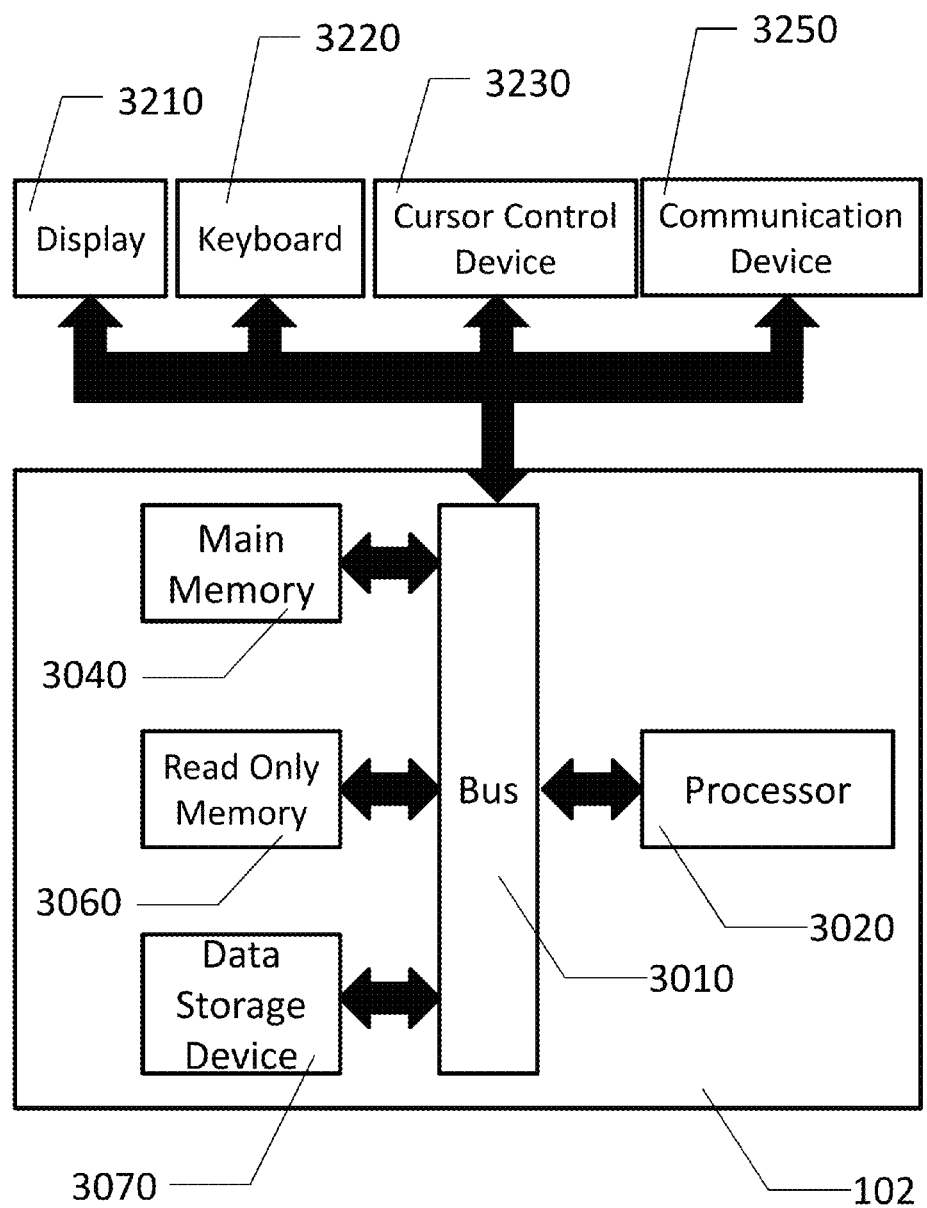
FIG. 22 shows a typical computer system as can be used to implement embodiments of the present invention.

FIG. 22 illustrates an exemplary computer system 102 upon which embodiments of the invention may be implemented. Computer system 102 comprises a bus or other communication means 3010 for communicating information, and a processing means such as processor 3020 coupled with the bus 3010 for processing information. Computer system 102 further comprises a random access memory (RAM) or other dynamically-generated storage device 3040 (referred to as main memory), coupled to bus 3010 for storing information and instructions to be executed by processor 3020. Main memory 3040 also may be used for storing temporary variables or other intermediate information during execution of instructions by processor 3020. Computer system 102 also comprises a read only memory (ROM) and/or other static storage device 3060 coupled to bus 3010 for storing static information and instructions for processor 3020.

A non-transitory data storage device 3070 such as a magnetic disk drive, an optical disk drive and/or flash drive storage may also be coupled to computer system 102 for storing information and instructions. Computer system 102 can also be coupled via bus 3010 to a display device 3210, such as a Liquid Crystal Display (LCD), for displaying information to an end user. Typically, an alphanumeric input device (keyboard) 3220, including alphanumeric and other keys, may be coupled to bus 3010 for communicating information and/or command selections to processor 3020. Another type of user input device is cursor control 3230, such as a mouse, a trackball, or cursor direction keys for communicating direction information and command selections to processor 3020 and for controlling cursor movement on display 3210.

A communication device 3250 is also typically coupled to bus 3010. The communication device 3250 may include a network interface card, a modem, a wireless transceiver or other well-known interface device for purposes of providing a communication link to support a local or wide area network. In this manner, the computer system 102 may be coupled to the internet or other cloud-based computing network.

It is appreciated that a lesser or more equipped computer system than the example described above may be desirable for certain implementations. Therefore, the configuration of computer system 102 will vary from implementation to implementation depending upon numerous factors, such as price constraints, performance requirements, technological improvements, and/or other circumstances. Further, computing machines as used herein include tablet computers, smart phones and other similar devices wherein the input and display devices may, for instance, both comprise a touch screen.

It should be noted that, while the operations described herein may be performed under the control of a programmed processor, such as processor 3020, in alternative embodiments, the operations may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited operations are performed by a specific combination of hardware components.

Figure 6:
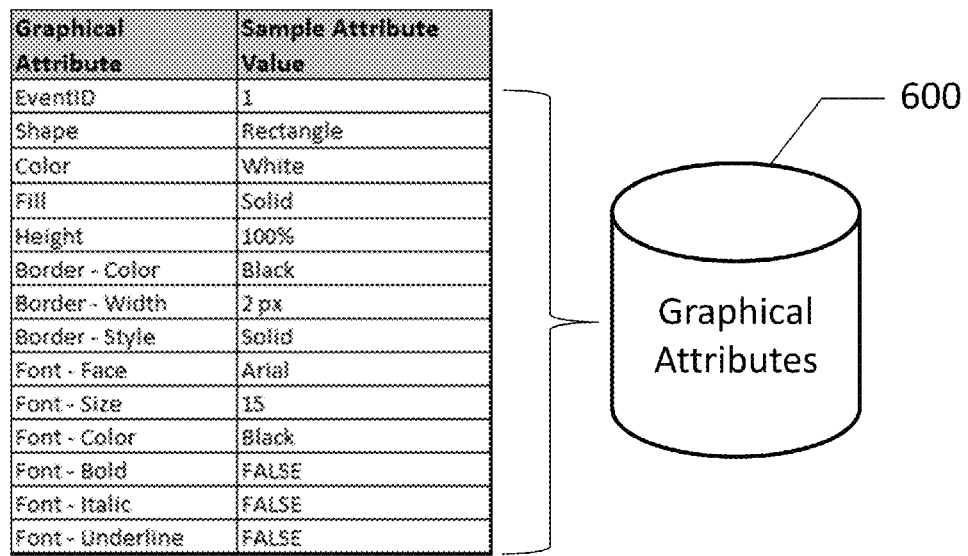
FIG. 6 shows Graphical Attributes for a Marker according to an embodiment of the present invention

One embodiment of the invention is illustrated in FIG. 1. A set of Event Data 100 is present on a computer 102 implementing the invention, which transforms the Event Data 100 into a Project View 104 that is displayed on the screen of the computer 102. The Project View 104 contains a set of Markers 110 with Graphical Attributes 600 in FIG. 6 defining the color, shape, font, size, border style and other graphical properties of the Marker. Each Marker 110 corresponds to an Event 106, which is a task or milestone in a project plan. In this example, the Event is a task entitled "Engineering Team 1 Development," and its Marker 110 is positioned horizontally along a Timeline 108 according to its StartTime of Feb. 3, 2012 and its EndTime of May 16, 2012. A Time Cursor 118 shows the position of a Snapshot Date 302 from FIG. 3 along the same Timeline 108. A Legend 116 lists the combinations of shape, color and other Graphical Attributes 600 present on the screen. Furthermore the illustrated embodiment assigns each Marker 110 to a Row 112 that constrains its vertical position on the screen. The described embodiment may also group a set of adjacent Rows 112 to form a Swimlane 114. Both the Row 112 assignment and the Swimlane 114 assignment of the Marker 110 may also depend upon Data Attributes 400 of the Event 106.

Figure 2:
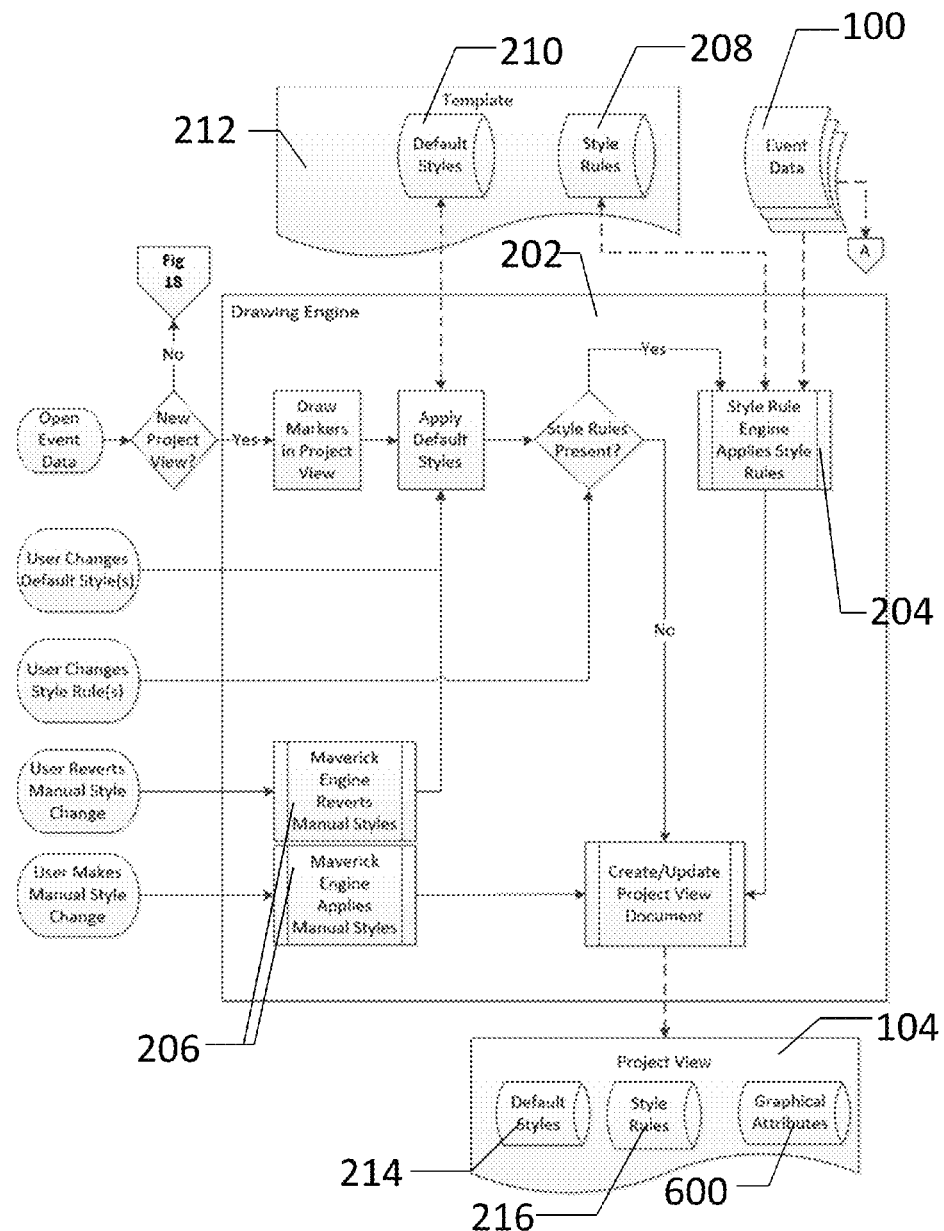
FIG. 2 shows the process for illustrating Event Data by applying Graphical Attributes to Markers in a new Project View based on the Data Attributes for each Event in the Event Data and upon Default Styles and Style Rules from a Template according to an embodiment of the present invention. In this figure, solid lines show the flow of control, whereas dashed lines show the flow of data.
Figure 3:
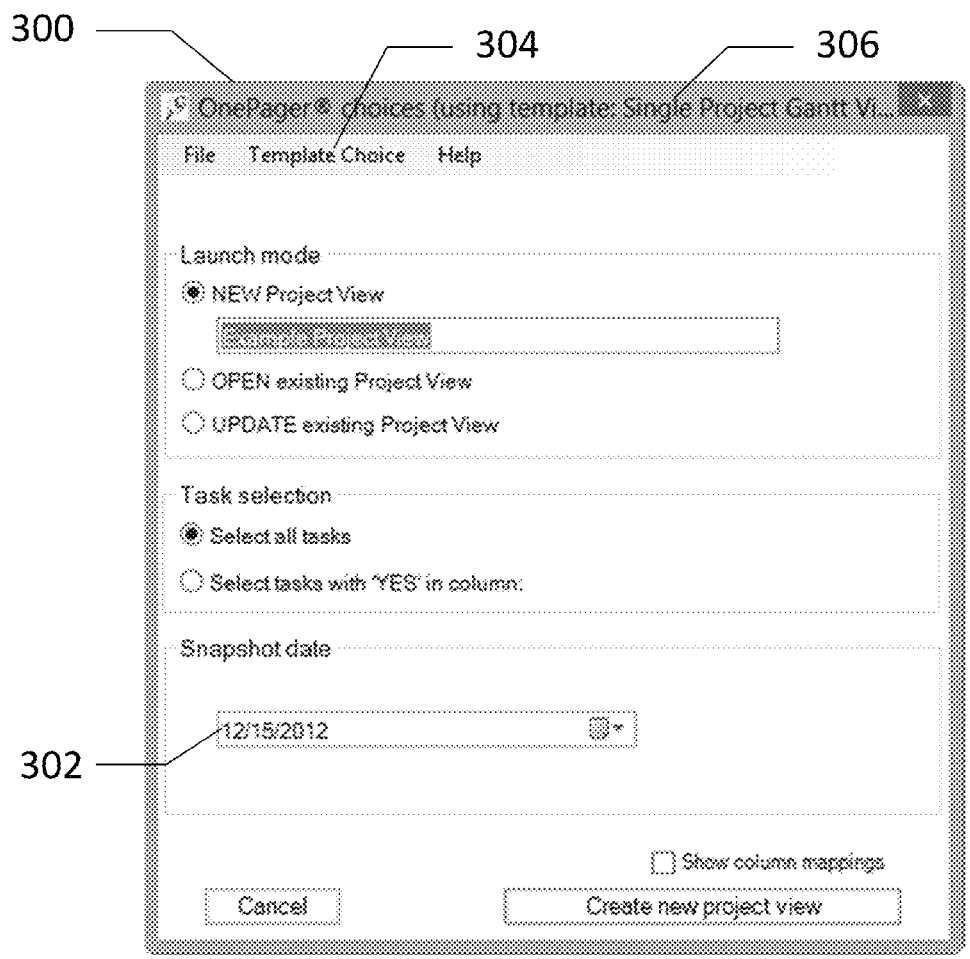
FIG. 3 shows a form method to create a new Project View from Event Data according to an embodiment of the present invention.

FIG. 2 illustrates the detailed method for creating the new Project View 104 from Event Data 100. One or more sets of Event Data 100, in this case, project plans, are loaded into the non-transient storage of the computer 102. The Configuration Form 300 is shown in FIG. 3, and specifies the initial Snapshot date 302 and a Template 212 for the Project View 104. The Template provides the initial set of Default Styles 210 and Style Rules 208 for computing the Graphical Attributes 600 for each Marker 110. The user may choose from a set of available Templates 212 by clicking on the Template Drop-Down 304, and his Template 212 choice will be displayed as the Template Name 306 in the title bar of the Configuration Form 300.

Figure 4:
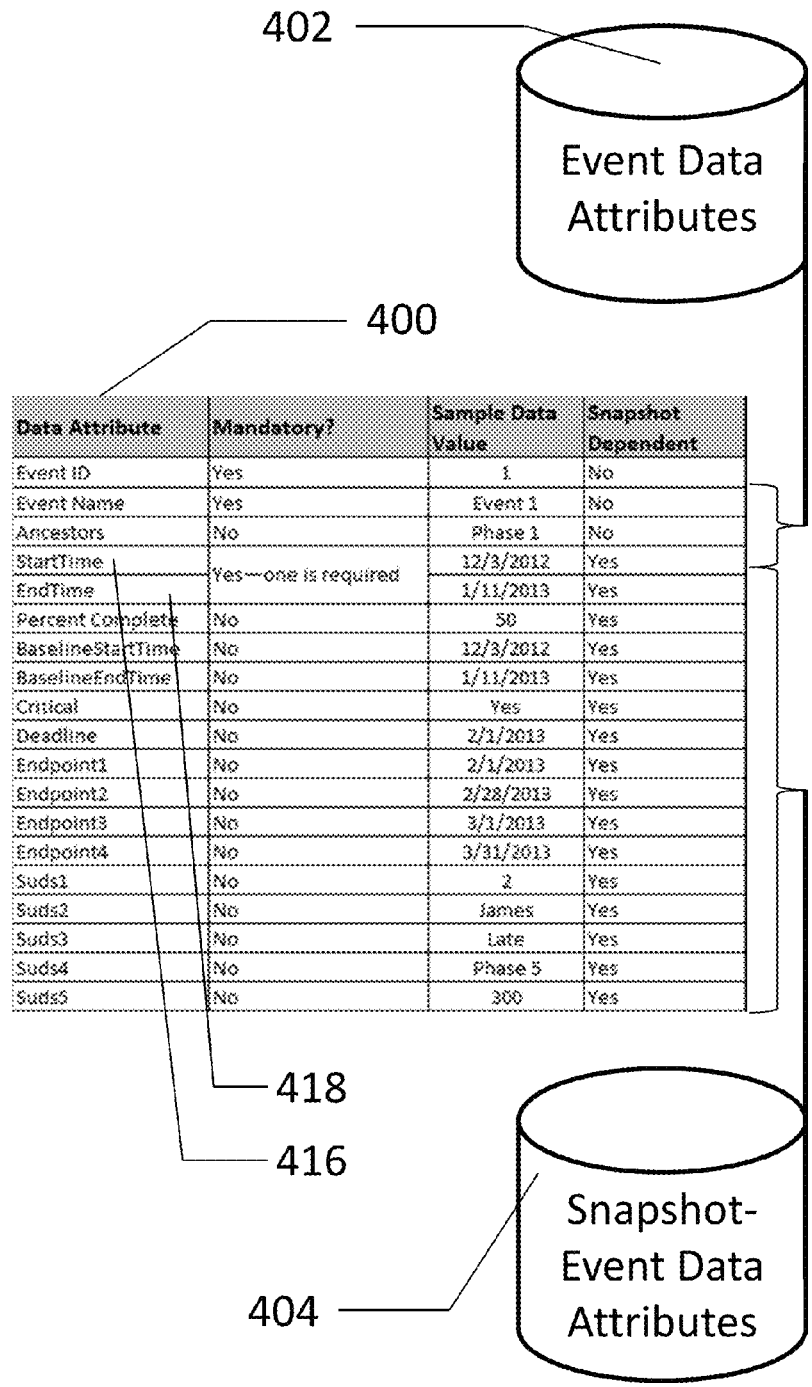
FIG. 4 shows mandatory and optional Data Attributes for an Event according to an embodiment of the present invention.
Figure 5:
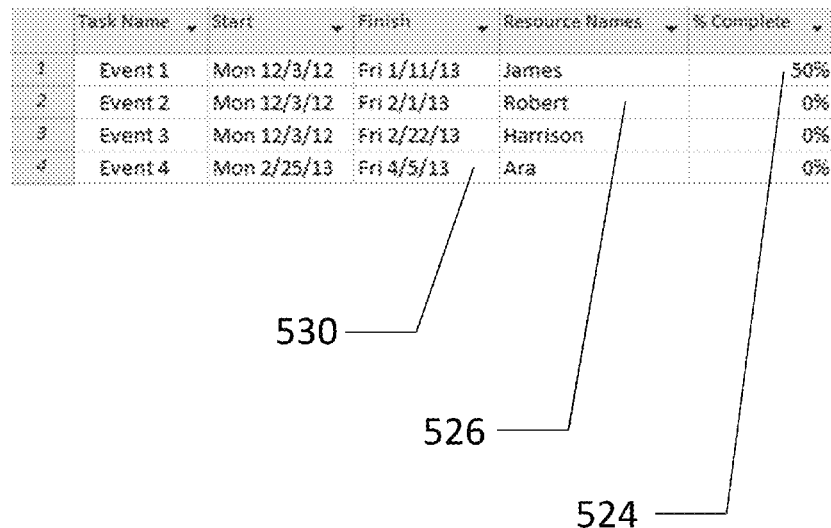
FIG. 5 shows an example set of Data Attributes, with an example Project View created using Default Style Settings according to an embodiment of the present invention.
Figure 5:
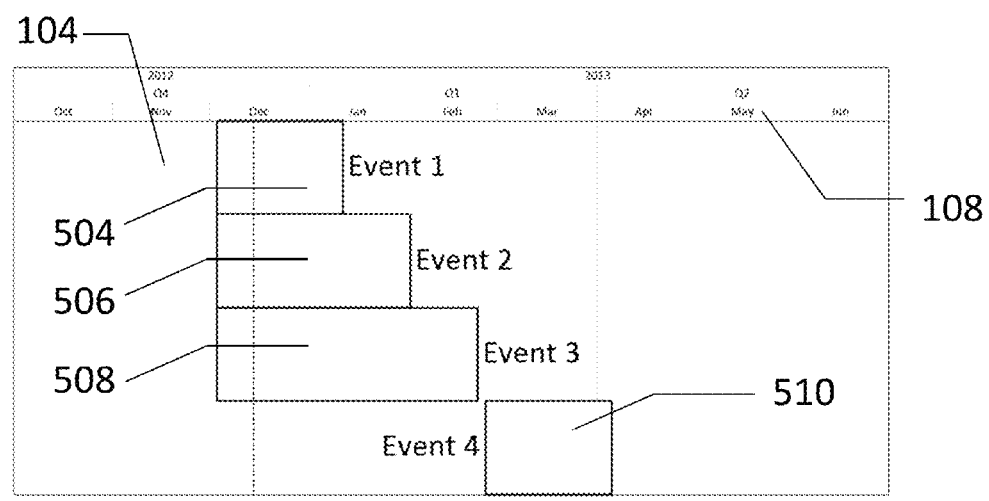

In FIG. 5, an example Marker 504 labeled "Event 1", among others, is drawn on the screen of the computer 102 in accordance with an Event's StartTime Data Attribute 416 and EndTime Data Attribute 418, shown in FIG. 4. A set of Default Styles 210 from the chosen Template 212 is applied to the example Marker 504, and also to a set of other example Markers 506, 508 and 510, resulting in the Project View 104 being transformed on the computer screen to resemble FIG. 5. In this example, the Graphical Attributes 600 are assigned in accordance with the Default Styles 210, which consist in this example of a rectangular shape, a white color, a solid black border, and a black Calibri 15-point font.

Figure 7:
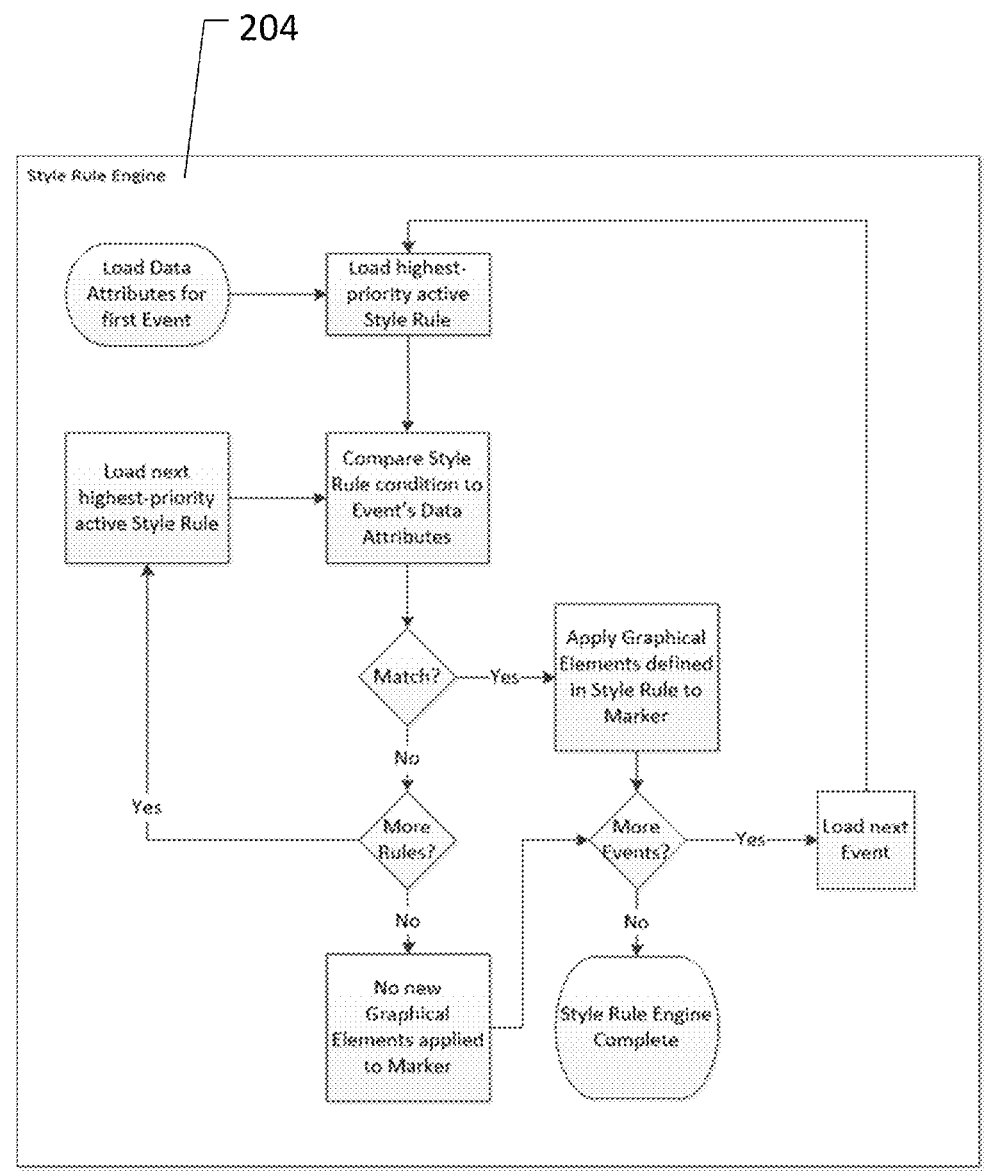
FIG. 7 depicts the Style Rule Engine, a software sub-process that assigns rules-based styles to Markers according to an embodiment of the present invention.

If Style Rules 208 are present in the Template 212, then the embodiment runs a Style Rule Engine 204 to apply them. FIG. 7 illustrates the detailed sub-process that is followed by the Style Rule Engine 204 running on the computer 102. The Style Rule Engine 204 commences by loading the set of Data Attributes 400 for an Event 106. The Data Attributes 400 are depicted in FIG. 4. The user does not need to modify the Event Data 100 or Data Attributes 400 prior to the launch of the Style Rule Engine 204 because the Style Rule Engine 204 is able to look at any existing Data Attributes 400 of any data type (e.g. date, string, Boolean, or number) for the purposes of creating and applying Style Rules 208. The Style Rules 208 are also loaded from the Template 212, and are compared in order of priority to the Data Attributes 400 for each Event 106.

Figure 8:
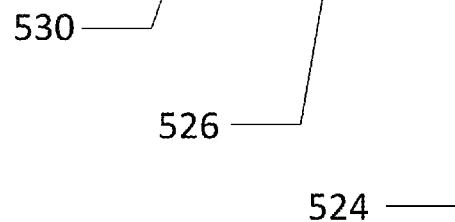
FIG. 8 shows an example set of Data Attributes, and an example Project View after Style Rules have been applied according to an embodiment of the present invention.
Figure 8:
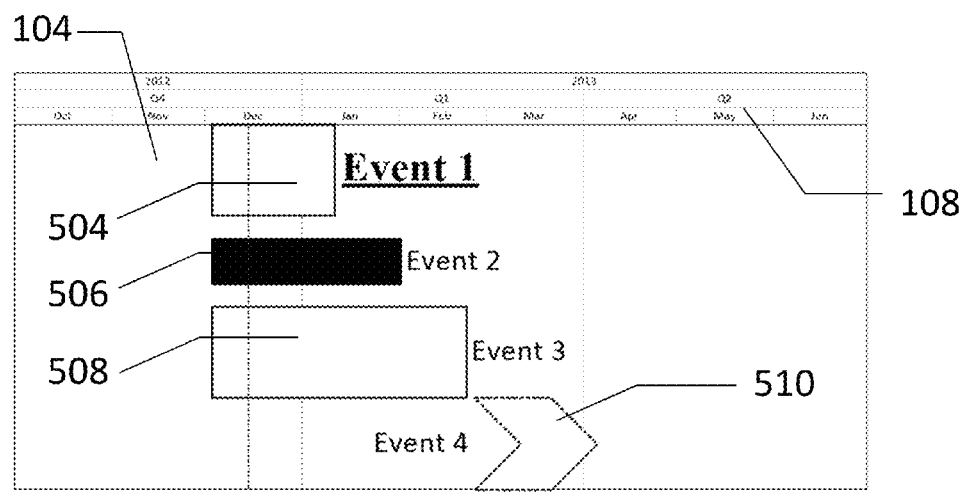

Style Rules 208 are then matched against the Data Attributes 400 of the Event 106, and the Graphical Attributes 600 are updated accordingly. FIG. 8 illustrates example transformations to the Project View 104 of FIG. 5 after Style Rules 208 have been applied. Marker 504 changes its font to Times New Roman, bold, underlined, 20 point in accordance with a Style Rule 1034 in FIG. 10 since its Data Attribute 524 satisfies the rule condition that the value in the "% Complete" column is greater than or equal to 50. In this case, the "%" sign in the Data Attribute is stripped away to convert the Data Attribute 524 into a floating-point number so that the numerical comparison with the number 50 can be carried out. Marker 506 changes to a black color and marker height that is 50% of its Row 112 height in accordance with a Style Rule 1030 since its Data Attribute 526 in the "Resource Name" column contains the substring "Rob". Marker 508 retains the Default Styles 210 because none of the Style Rules 208 matches. Marker 510 changes its shape to a chevron and its border to a dashed line in accordance with a Style Rule 1032 because its Data Attribute 530 in the "Finish" column is later than Apr. 1, 2013.

Figure 9:
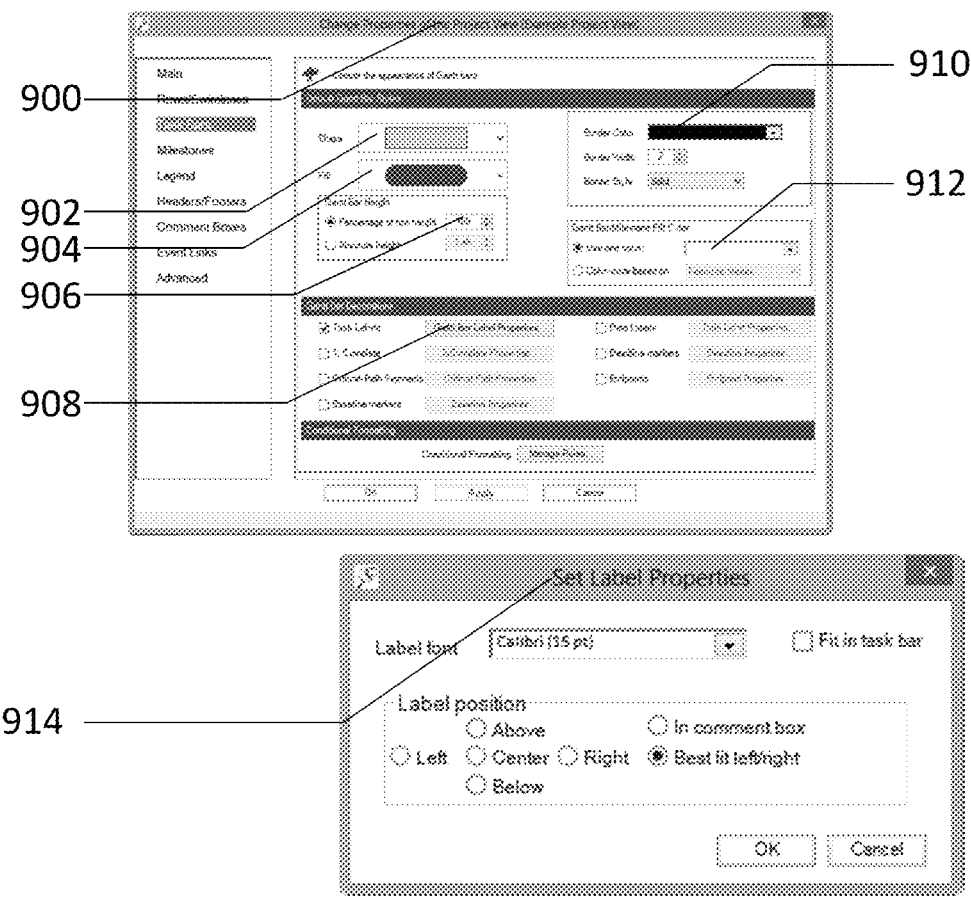
FIG. 9 shows a form method for specifying default (data-independent) Graphical Attributes for Markers according to an embodiment of the present invention.
Figure 23:
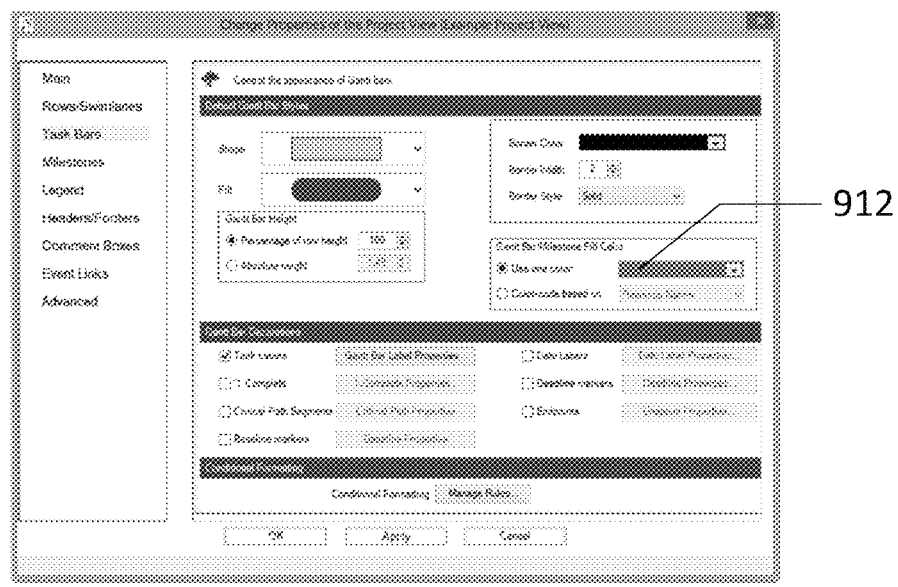
FIG. 23 shows an example Project View after Default Styles have been modified using a form according to an embodiment of the present invention.
Figure 23:
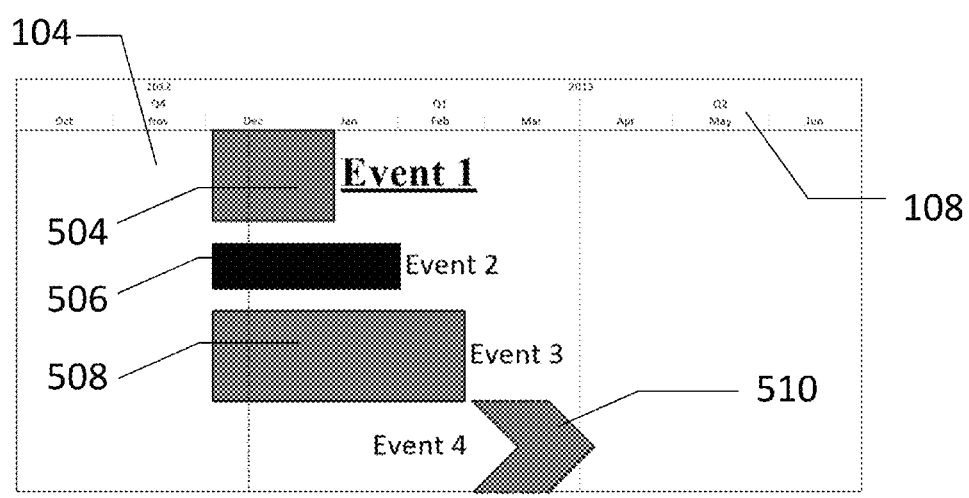

FIG. 2 also illustrates how the user uses the embodiment to modify the Marker 110 graphical formats in Project View 104. When the new Project View 104 is created, the embodiment copies the Default Styles 210 and Style Rules 208 from the Template 212 into the Project View 104 itself. The Default Styles 214 stored in the Project View 104 may be changed using a default format settings screen 900, shown in FIG. 9. The default format settings screen 900 contains a default shape control 902, a default fill control 904, a default height control 906, a set of default border controls 910, and a default color control 912. The default format settings screen 900 also contains a default font control button 908, which will open a second default font settings screen 914. Once the Default Styles 214 are modified through the default format settings screen 900 or the default font settings screen 914, the new Default Styles 214 are reapplied to the Project View 104 by the Drawing Engine 202 accordingly. FIG. 23 shows the same Project View 104 example as in FIG. 8 after the default color control 912 is modified to a gray color, which changes the Default Styles 214. Markers 504, 508, and 510 were using the original Default Style 210 of white, and are still using the default, so are updated to the gray color in accordance with the new default. Marker 506, however, had changed to a black color in accordance with the Style Rule 1030 and remains unchanged by modifications to the Default Styles 214 in the Project View 104. Thus the provided embodiment enforces the principal that rule-based style takes precedence over default style.

Figure 10:
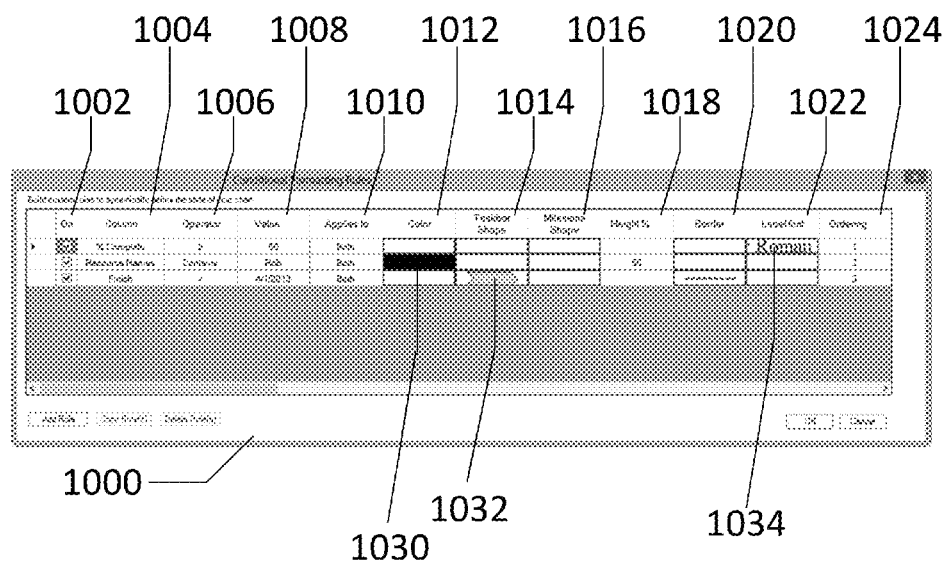
FIG. 10 shows a form method for specifying Style Rules for Markers. This example shows three Style Rules, one in each row of the grid according to an embodiment of the present invention.

The embodiment also provides capability for the user to modify Style Rules 208 in the Template 212 and Style Rules 216 in the Project View 104 by using a style rules settings screen 1000, an example of which (with three rules) is shown in FIG. 10, where each rule is represented by a row in the grid. The style rules settings screen 1000 contains a switch 1002 allowing each rule to be turned on and off. Each rule from Style Rules 208 (in the Template 212) and 216 (in the Project View 104) are triggered in the Style Rule Engine 204 when a Data Attribute in the tested column 1004 matches the tested value 1008 using the operator 1006. The operators 1006 can test numbers, dates, string, Booleans, or other data types. The style rules settings screen 1000 specifies whether each rule applies 1010 to task Markers, milestone Markers, or both, and then goes on to define the Graphical Attributes 600, in particular task shape 1014, milestone shape 1016, height 1018, border style 1020, and font style 1022. The Style Rules 216 are processed by the computer 102, and Graphical Attributes 600 applied, such that the rule with the lowest-numbered ordering 1024 has a higher priority than any other Style Rules 216 that might also be true. For each Graphical Attribute 600, the lowest-number rule that applies determines the format assignment. If no rule applies, then the Default Style 214 determines the format assignment.

Figure 11:
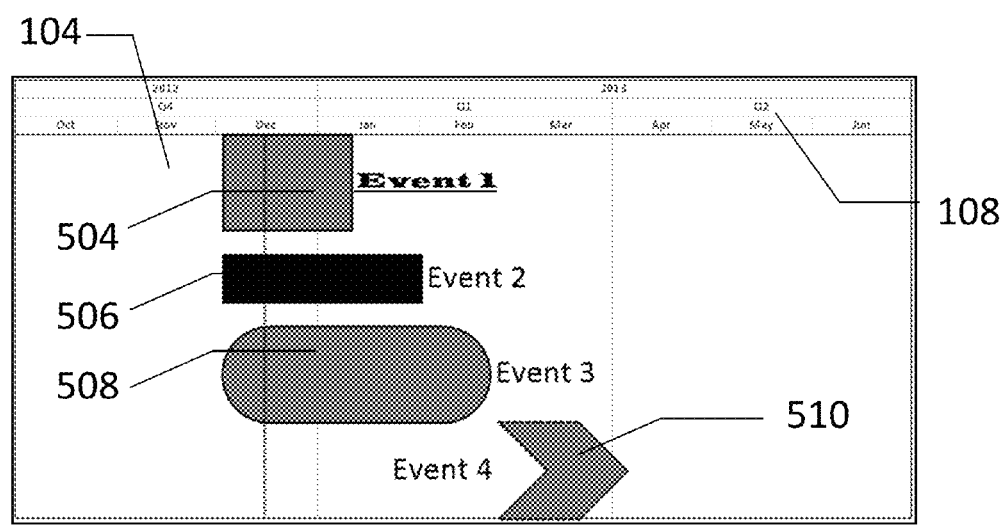
FIG. 11 shows an example Project View after some Markers have been given Maverick Graphical Attributes according to an embodiment of the present invention.

The Default Styles 214 and the Style Rules 216 in the Project View 104 may be overridden by manual style selections known as Mavericks. FIG. 11 shows that Marker 504 from FIG. 23 has had its font changed to Wide Latin, bold, underlined, 10-point, meaning that it no longer adheres to the Style Rule 1034. Likewise, Marker 508 has had its shape changed from the default rectangle to a pill shape, and no longer adheres to the Default Styles 214. Maverick settings can change the height, font, color, fill and shape of the Graphical Attributes 600 by overriding both the Default Styles 214 and the Style Rules 216.

Figure 12:
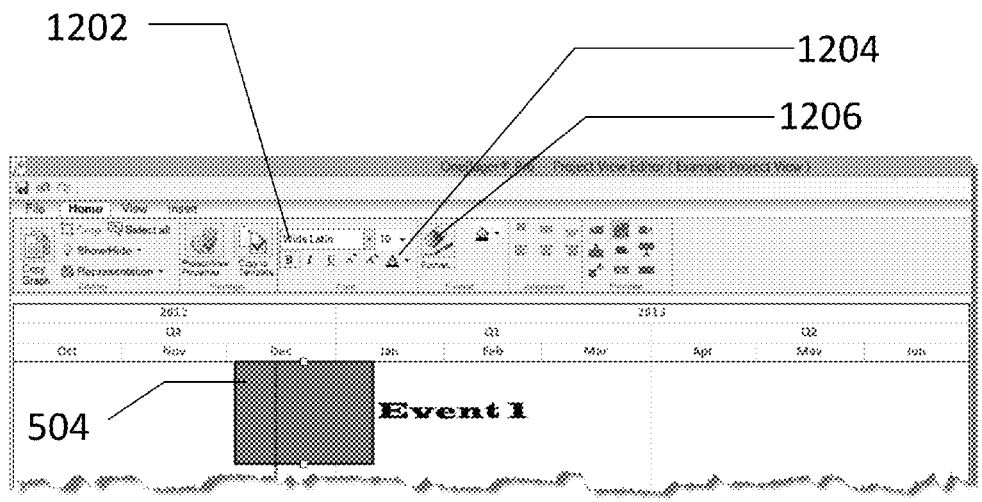
FIG. 12 shows a menu method for setting select Maverick Graphical Attributes for a Marker according to an embodiment of the present invention.
Figure 13:
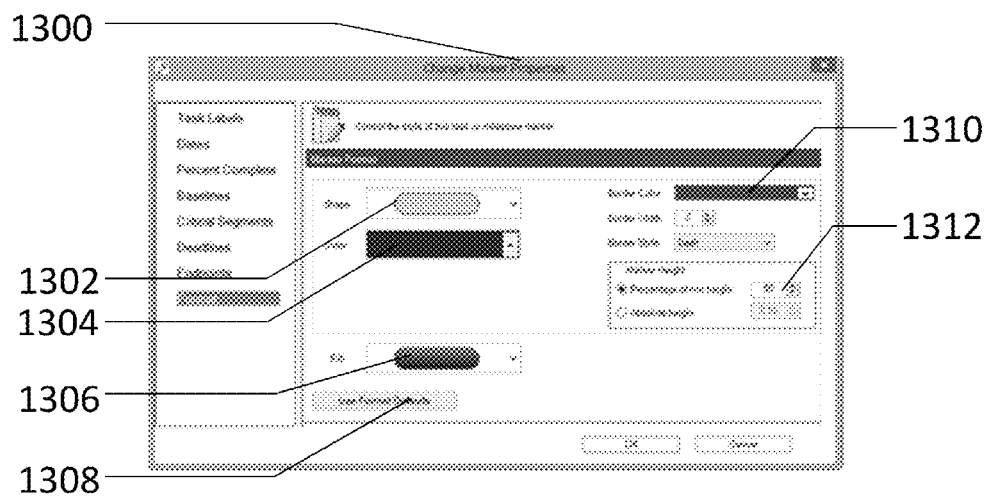
FIG. 13 shows a form method for setting some Maverick Graphical Attributes for a Marker according to an embodiment of the present invention.
Figure 14:
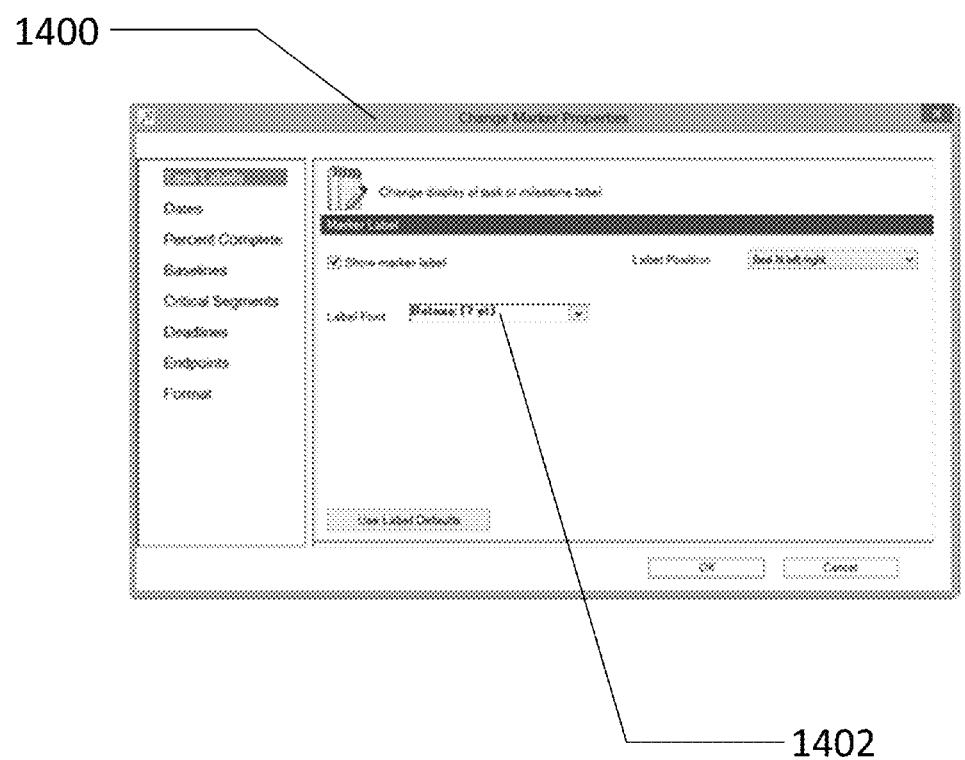
FIG. 14 shows a form method for setting additional font-related Maverick Graphical Attributes for a Marker according to an embodiment of the present invention.

FIG. 12 shows that the user can create a maverick by using a computer 102 input device to left-click on a Marker 504, and then change styles using a set of font controls 1202, a color control 1204, or by clicking on a format button 1206 that allows for additional maverick style configuration. Clicking the format button 1206 launches a format screen 1300, which is shown in FIG. 13. The format screen 1300 contains a shape control 1302, a color control 1304, a fill control 1306, a set of border controls 1310, and a height control 1312. A task labels tab 1400 shown in FIG. 14 can be launched from the format screen 1300, and provides a font control 1402. Changing one or more styles using the format screen 1300, the task labels tab 1400, the font controls 1204, or color control 1206 will launch a Maverick Engine 206 to apply these new styles, and record them in the Graphical Attributes 600. These maverick format assignments override both the Default Styles 214 and the Style Rules 216. Conversely, clicking the restore defaults button 1308 on the format screen 1300 will launch the Maverick Engine 206 to reapply Style Rules 216 or Default Styles 214 and update the Graphical Attributes 600 accordingly.

Figure 15:
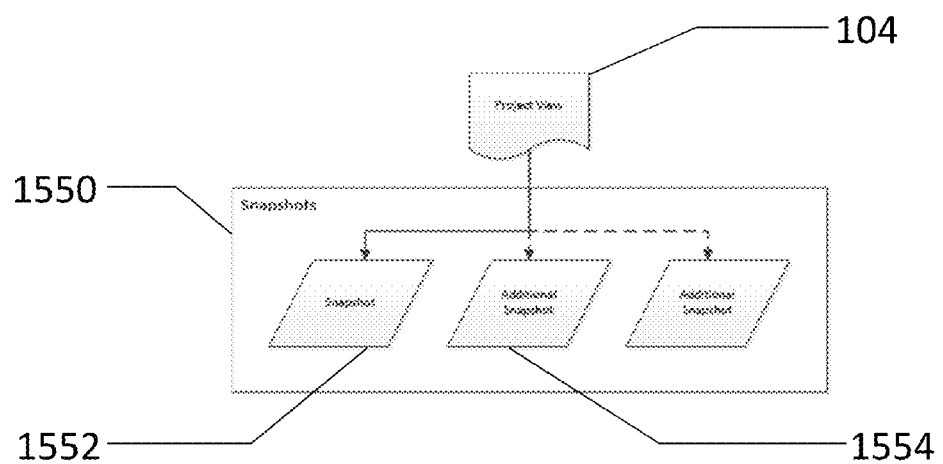
FIG. 15 shows the relationship between a Project View and a plurality of Snapshots, where each Snapshot represents a different version of the Event Data with each version to be rendered in the same graphical style for ease of comparison according to an embodiment of the present invention.
Figure 16:
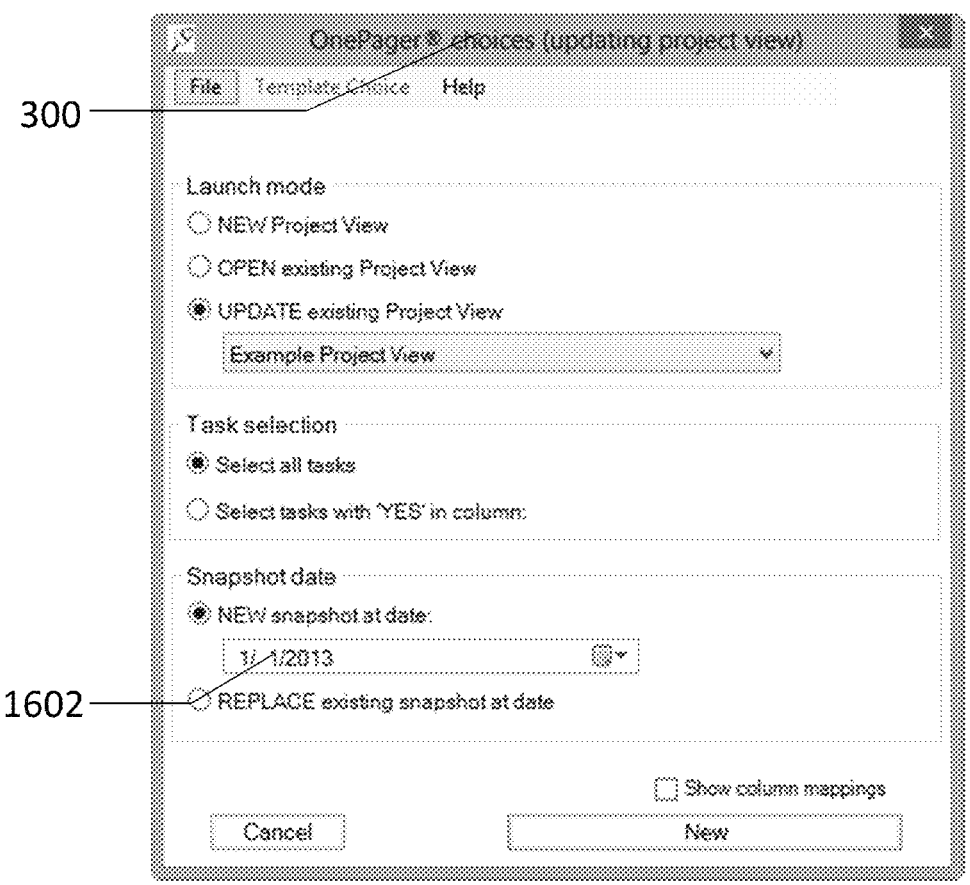
FIG. 16 shows a form method to update an existing Project View, adding a new Snapshot according to an embodiment of the present invention.
Figure 17:
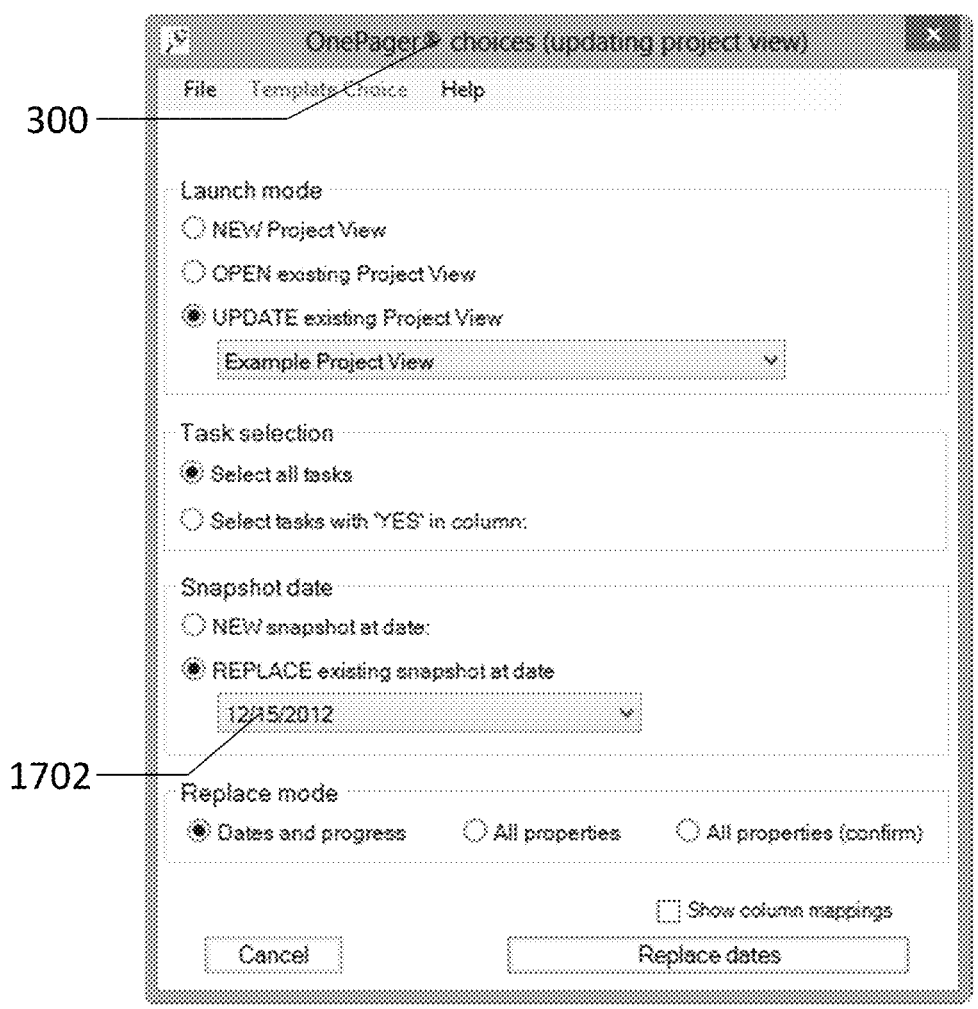
FIG. 17 shows a form method to update an existing Project View by updating the Event Data in an existing Snapshot according to an embodiment of the present invention.

The embodiment also allows the existing Project View 104 to be updated with revisions to the Event Data 100, and for changes to be made to Graphical Attributes 600 when such changes in one or more Data Attributes 400 causes the rule matching against the Style Rules 216 to change. When Event Data 100 changes, the Project View 104 may be updated, either creating an Additional Snapshot 1554 or overwriting an existing Snapshot 1552. A Snapshot is a specific version of the Event Data 100 that is employed to track the evolution of a project plan over time or to illustrate project "what-if" scenarios. The relationship between the Project View 104, the existing Snapshot 1552, and the Additional Snapshots 1554 are depicted in FIG. 15. The embodiment provides methods to ensure that the additional snapshots or overwritten snapshots continue to adhere to the style precedence discussed above: mavericks take precedence over Style Rules 216, which take precedence over Default Styles 214. When the Additional Snapshot 1554 is created, the Configuration Form 300 allows for the new Snapshot Date 1602 to be specified, as shown in FIG. 16. When the existing Snapshot 1552 is updated, the Configuration Form 300 allows for the existing Snapshot Date 1702 to be selected, as shown in FIG. 17.

Figure 18:
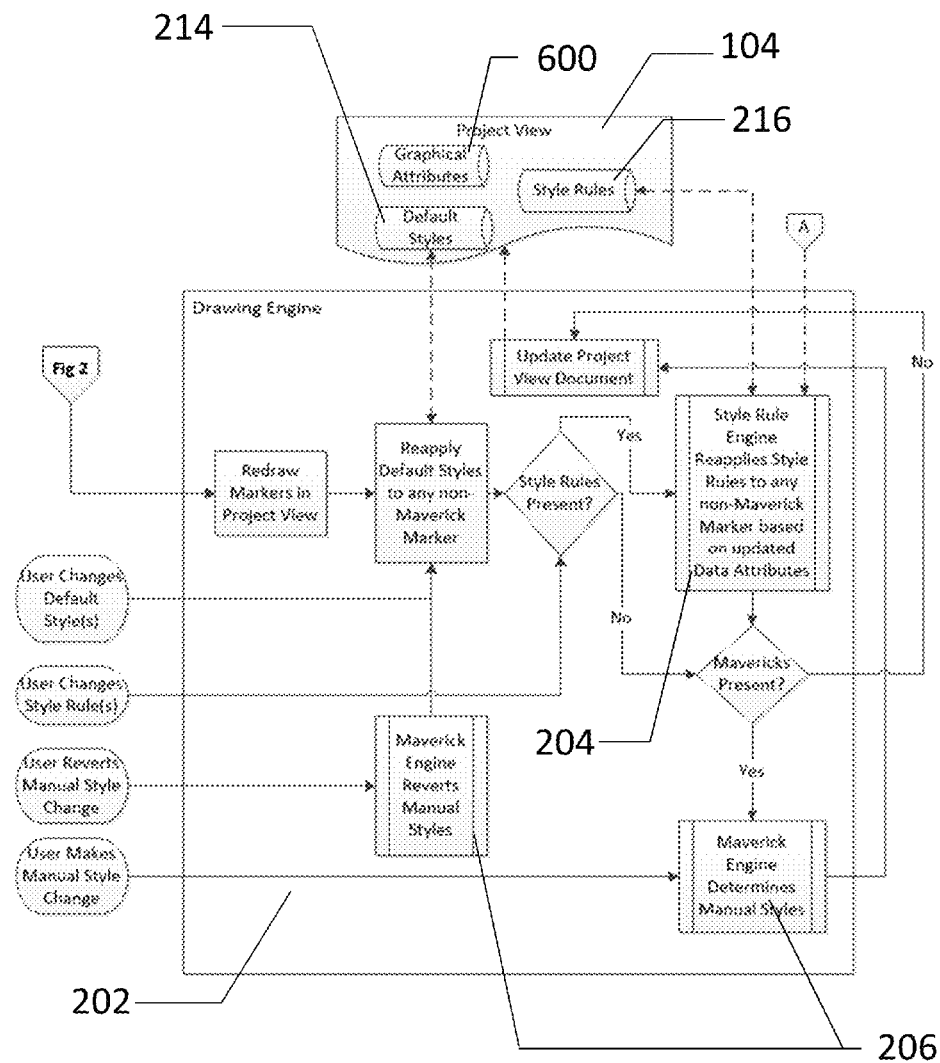
FIG. 18 shows the process for applying Graphical Attributes for existing Project Views when the Event Data is being updated or when a new Snapshot is being added to the Project View according to an embodiment of the present invention. In this figure, solid lines show the flow of control, whereas dashed lines show the flow of data.

FIG. 18 illustrates the process for updating the Project View 104, whether the Additional Snapshot 1554 is created, or the existing Snapshot 1552 is updated. After the Configuration Form 300 has been completed with either the new Snapshot Date 1602 or the existing Snapshot Date 1702, the Data Attributes 400 for the snapshot in question are processed by the Drawing Engine 202.

The Default Styles 214 and the Style Rules 216 of the Project View 104 are reapplied by the computer 102 in any case where the Graphical Attributes 600 are not Mavericks. As the Style Rules 216 are reapplied, any changes to Snapshot-Event Data Attributes 404 can necessitate changes to the Graphical Attributes 600 if the match conditions evaluate differently with the changed Data Attributes 400. When the Project View 104 contains more than one of the Snapshots 1550, Graphical Attributes 600 may vary from one of the Snapshots 1552 to another of the Snapshots 1554 due to differing Snapshot-Event Data Attributes 404. Event Data Attributes 402 are not designed to vary across different Snapshots 1550, so Graphical Attributes tied to Event Data Attributes 402 will not vary across different Snapshots 1550. If a Graphical Attribute in the set of Graphical Attributes 600 is Mavericked, the embodiment will ensure that the Mavericked Graphical Attribute 600 will continue to be Mavericked in the Additional Snapshot 1554 until otherwise changed.

Figure 19:
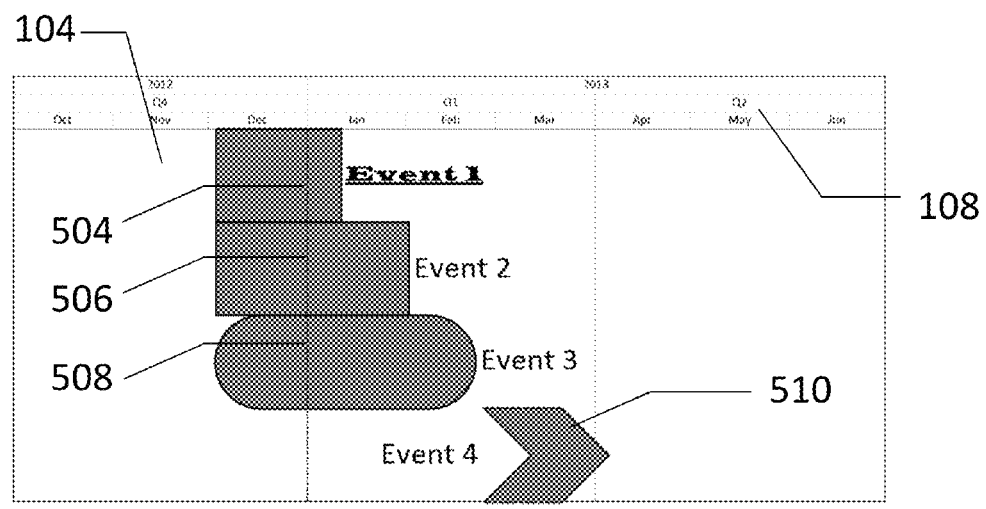
FIG. 19 shows an example Project View with an Additional Snapshot where Style Rules have been reapplied and Mavericks have been preserved according to an embodiment of the present invention.

In the example Project View 104, when the Additional Snapshot 1554 is created, the Style Rules 216 are reapplied to account for any changes to the Data Attributes 400. FIG. 19 shows that Data Attribute 526 from FIG. 11 has changed to "Nathan" and therefore no longer triggers Style Rule 1030, which tests for a string value containing "Rob". Because Style Rule 1030 no longer applies, and no other Style Rules 216 apply either, Marker 506 from FIG. 11 reverts to the Default Styles 214, meaning that it returns to the default gray color and 100% Row 112 height shown in FIG. 19. Markers 504 and 508 do not change their font or shape, respectively, because they are Mavericks, and are no longer adhering to the Style Rules 216 or the Default Styles 214. Marker 510 does not change its appearance because its Snapshot-Event Data Attributes 404 have not changed, meaning that the same Style Rule 1032 still applies.

Figure 24:
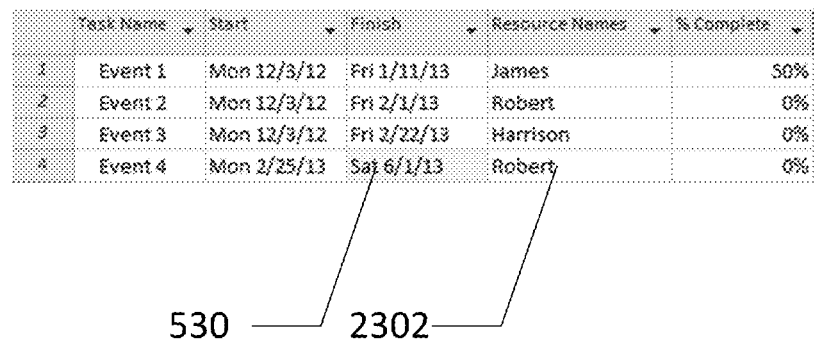
FIG. 24 shows a set of Data Attributes and the resulting Project View after updating an existing Snapshot according to an embodiment of the present invention.
Figure 24:
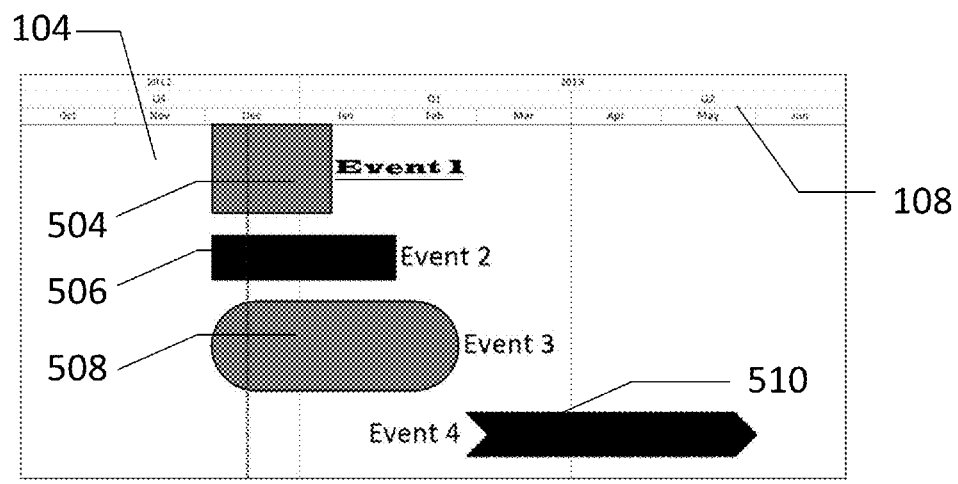

In the example Project View 104, when the existing Snapshot 1552 is replaced, the Style Rules 216 are reapplied to account for any changes to the Data Attributes 400. FIG. 24 shows the results of these changes compared to FIG. 11. Markers 504 and 508 were previously Mavericked, so their fonts and shape, respectively, do not change. Marker 506 remains unchanged because the Style Rule 1030 still applies. Marker 510 has changed in two ways. Because Data Attribute 530 has changed from its previous value of Apr. 5, 2013 to Jun. 1, 2013, the Marker 510 is moved along the Timeline 108 to accurately represent the new dates. Because Marker 530's value of Jun. 1, 2013 is still greater than the value of Apr. 1, 2013 in Style Rule 1032, the chevron shape and dashed outline are still visible. However, Data Attribute 2302 has also been changed from "Ara" to "Robert", meaning that Style Rule 1030 now applies in conjunction with Style Rule 1032. As a result, Marker 510 is further updated to a black color and marker height that is now reduced to 50% of Row 112 height.

Figure 20:
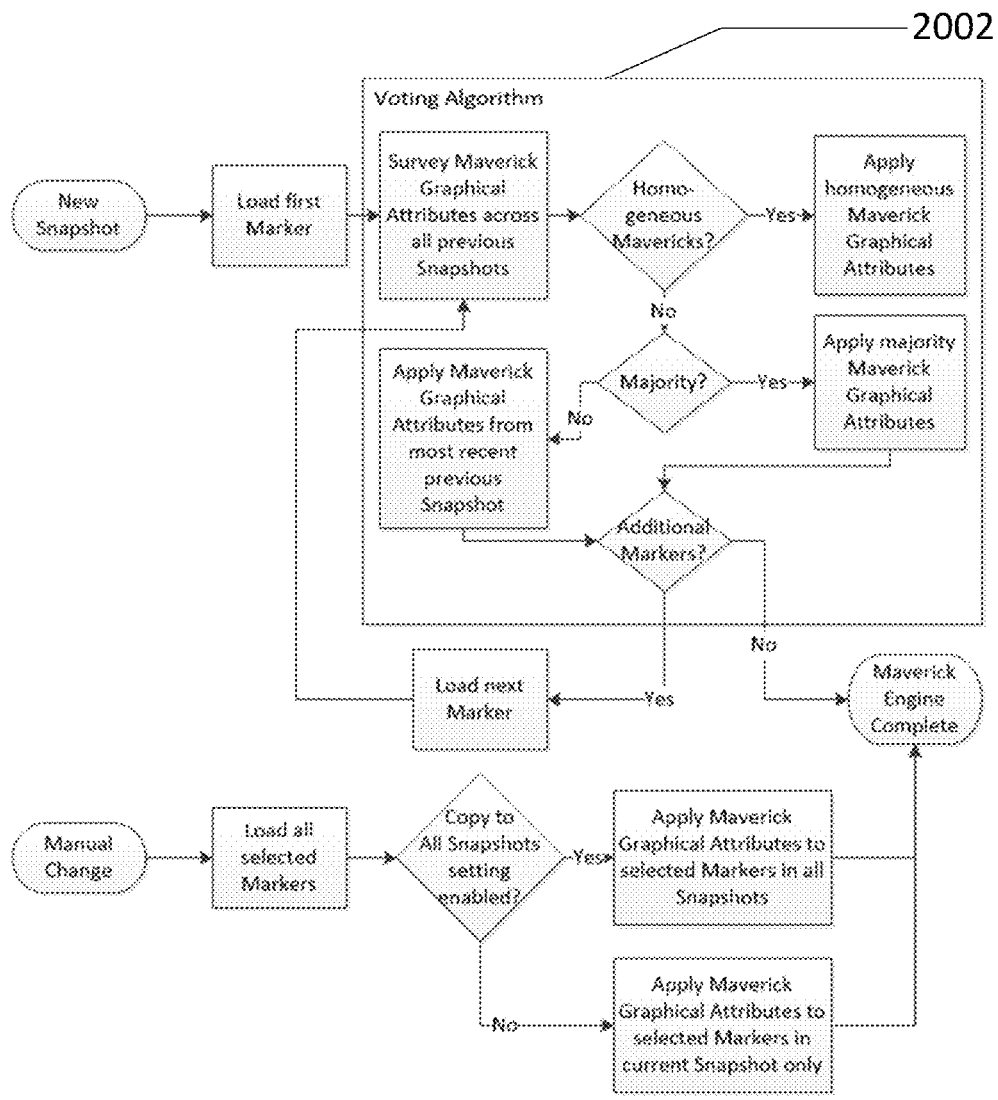
FIG. 20 depicts the Maverick Engine, a software sub-process which applies and removes manual style selections for Markers according to an embodiment of the present invention.
Figure 21:
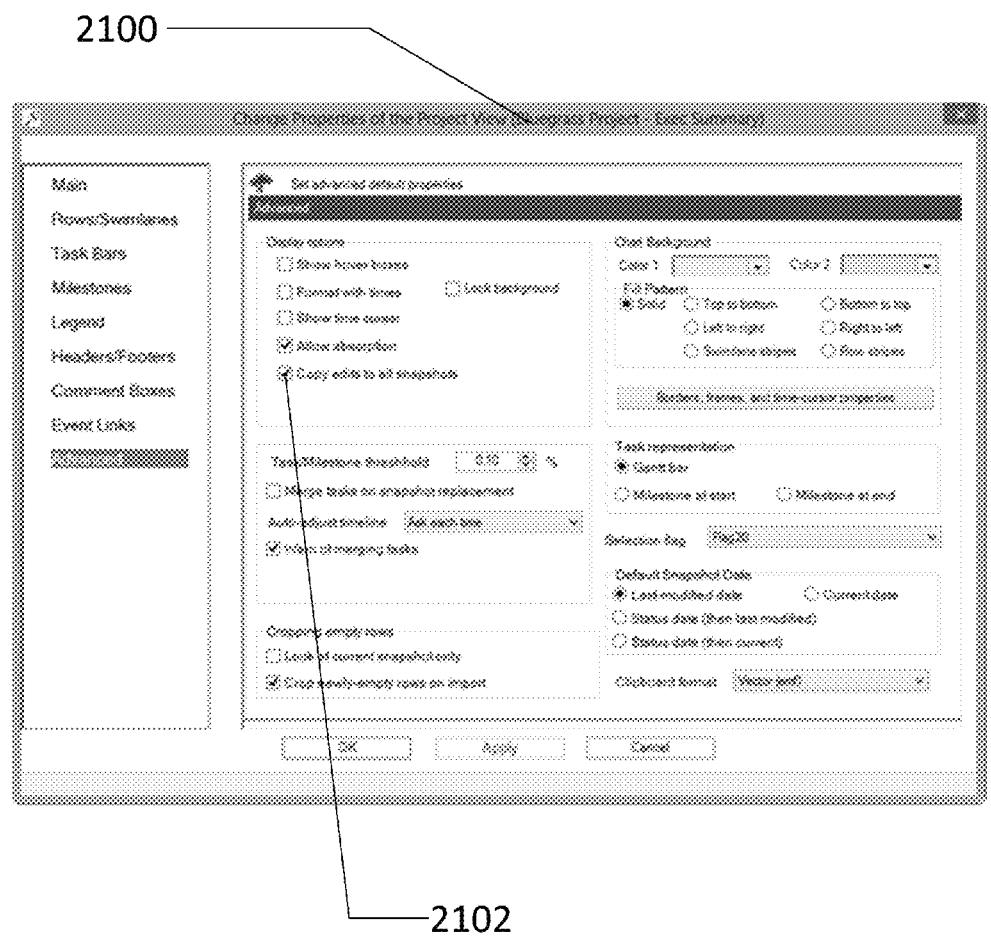
FIG. 21 shows a form method specifying whether Maverick Graphical Attributes should be copied to Markers in other Snapshots according to an embodiment of the present invention.

FIG. 20 gives the detailed method of the Maverick Engine 206, which is a software sub-process for applying and reverting individual Graphical Attributes 600 that are Mavericks. When one of the Graphical Attributes 600 is changed into a Maverick for the exemplar Marker 504 and others, the Maverick Engine 206 redraws the Marker 504 and others to reflect the updated style. In this case FIG. 20 also shows that the Maverick Engine 206 allows specification of whether Maverick Graphical Attributes 600 should be applied to all Snapshots 1550, or simply the Snapshot 1550 that is currently visible to the user on the screen. An advanced settings form 2100, shown in FIG. 21, provides a copy to all snapshots setting 2102, which when enabled, will apply the Maverick Graphical Attributes 600 to all of the Snapshots 1550 in the Project View 104. When the copy to all snapshots setting 2102 is disabled, only the current Snapshot 1554 will receive the Maverick Graphical Attributes 600.

Continuing to refer to FIG. 20, in cases where the Project View 104 contains more than one of the Snapshots 1550 and each of the Snapshots 1550 contains different Maverick Graphical Attributes 600, the Maverick Engine must perform a voting algorithm 2002 to determine the Graphical Attributes 600 for the Additional Snapshot 1554. The voting algorithm 2002 tests whether the Maverick Graphical Attributes 600 are identical across all of the other Snapshots 1550. If so, the Additional Snapshot 1554 receives the same Maverick Graphical Attributes 600. If the Maverick Graphical Attributes 600 are heterogeneous across all of the previous Snapshots 1550, the voting algorithm 2002 determines which of the Maverick Graphical Attributes 600 are in the majority, and applies those to the Additional Snapshot 1554. If there is no majority, then the voting algorithm 2002 instructs the computer 102 to select the Maverick Graphical Attributes 600 from the Snapshot 1550 that is closest in time to the Additional Snapshot 1554.

ADVANTAGES

From the description above, a number of advantages of the described embodiment become evident. It is to be appreciated that other embodiments falling within the scope of the claims may not exhibit some or even all of these advantages.

The described embodiment facilitates the creation of project reports using a standard set of visual characteristics stored in Templates, saving project managers considerable time compared to the process of manually configuring a common visual standard. Data-driven formatting rules can be utilized enabling consistent reporting across different projects, and providing for clear communication between project managers and key stakeholders. By modifying project data as a project progresses and/or changes, the formatting of tasks and milestones are automatically updated to reflect their new status as dictated by the preconfigured rules. This process of automatic updating saves project managers time, compared to making manual updates to a static project report. Further, it is a more accurate approach, with less room for human error, since updates are made dynamically based on values contained in the project data.

The selective application of maverick styles to particular tasks gives project managers greater flexibility to customize the appearance of project reports when default styles or style rules do not automatically generate the desired output. This added flexibility provides project managers with more control than they would have with fully-automated reporting, but without having to revert completely to manual reporting, which can be inaccurate and is typically more time-consuming.

CONCLUSION, RAMIFICATIONS, AND SCOPE

While the invention has been described and disclosed here in connection with certain embodiments, the description is not intended to limit the invention to the specific disclosed embodiments. Rather, the description is intended to provide an illustration of several exemplary embodiments, and the invention is intended to cover all embodiments and modifications that fall within the spirit and scope of the invention as defined by the appended claims as well as any equivalents thereof.

What is claimed is:

1. A computer-implemented method for representing events in a project as a project view, the method comprising:
 providing a computer system including a display, non-transient data storage, a processor; and an input device;
 storing event data containing data attributes pertaining to one or more events in the non-transient data storage, the data attributes having data types of at least one of strings, numbers, and dates;
 providing a set of style rules, the style rules relating one or more predetermined graphical attributes with one or more of said data attributes;
 for each of the one or more events, rendering a marker in the project view along a timeline on the display, the graphical attributes of each displayed marker being determined based on at least one data attribute of each event and one or more applicable graphical attributes associated with the data attributes as determined by the set of style rules;
 a user manually changing the graphical attributes of one or more of said markers to display the graphical attributes other than those dictated by the set of style rules; and
 updating the event data as pertaining to one or more events; and automatically re-rendering the markers in the project view based on changes in the data attributes except for the one or more markers having manually changed graphical attributes.

2. The computer-implemented method of claim 1, wherein the graphical attributes include at least one of color and marker shape.

3. The computer-implemented method of claim 1, wherein the data attributes comprise one or more of event start date, event status, event resources, event end date, and event progress.

4. The computer-implemented method of claim 1, wherein the project view comprises a first snapshot of the state of the project at a first point in time.

5. The computer-implemented method of claim 4, further comprising: adding one or more additional snapshots to the project view at different points in time; and for each of the one or more events, rendering the markers in each of the one or more additional snapshots, the graphical attributes of each displayed marker being determined based on the data attributes of each event at the different point in time and the applicable graphical attribute associated with the data attributes as determined by the set of style rules.

6. The computer-implemented method of claim 5, wherein the graphical attributes of the markers in the first snapshot do not change with the rendering of the one or more additional snapshots.

7. The computer-implemented method of claim 1 further comprising, activating a reversion option causing the manually-changed one or more markers to exhibit graphical attributes dictated by the set of style rules.

8. The computer-implemented method of claim 1 further comprising, creating and saving to the non-transient data storage, a template comprising the set of style rules, the template being configured for selective use with other project views.

9. A computer-implemented method for representing events in a project as a project view, the method comprising:
provyding a computer system including a display, non-transient data storage, a processor; and an input device;
storing event data containing data attributes pertaining to one or more events in the non-transient data storage, the data attributes having data types of at least one of strings, numbers, and dates;
providing a set of style rules, the style rules relating one or more predetermined graphical attributes with one or more of said data attributes;
for each of the one or more events, rendering a marker in the project view along a timeline on the display, the project view comprising a first snapshot of the state of the project at a first point in time, the graphical attributes of each displayed marker being determined based on at least one data attribute of each event and one or more applicable graphical attributes associated with the data attributes as determined by the set of style rules;
adding one or more additional snapshots to the project view at different points in time;
for each of the one or more events, rendering the markers in each of the one or more additional snapshots, the graphical attributes of each displayed marker being determined based on the data attributes of each event at the different point in time and the applicable graphical attribute associated with the data attributes as determined by the set of style rules; and a user manually changing the graphical attributes of one or more of said markers for the first snapshot to display graphical attributes other than those dictated by the set of style rules wherein the manual changes do not apply to the one or more markers in the one or more additional snapshots.

10. The computer-implemented method of claim 9, further comprising: updating the event data as pertaining to one or more events; and automatically re-rendering the markers in the project view based on changes in the data attributes.

11. The computer-implemented method of claim 9, further comprising a user manually changing the graphical attributes of one or more markers for the first snapshot to display graphical attributes other than those dictated by the set of style rules wherein the manual changes are also automatically applied to the one or more markers in the one or more additional snapshots.

12. A computer-implemented method for representing events in a project as a project view, the method comprising:
providing a computer system including a display, non-transient data storage, a processor; and an input device;
storing event data containing data attributes pertaining to one or more events in the non-transient data storage, the data attributes having data types of at least one of strings, numbers, and dates;
providing a set of style rules, the style rules relating one or more predetermined graphical attributes with one or more of said data attributes;
for each of the one or more events, rendering a marker in the project view along a timeline on the display, the project view comprising a first snapshot of the state of the project at a first point in time, the graphical attributes of each displayed marker being determined based on at least one data attribute of each event and one or more applicable graphical attributes associated with the data attributes as determined by the set of style rules;
adding one or more additional snapshots to the project view at different points in time;
for each of the one or more events, rendering the markers in each of the one or more additional snapshots, the graphical attributes of each displayed marker being determined based on the data attributes of each event at the different point in time and the applicable graphical attribute associated with the data attributes as determined by the set of style rules;
activating an override option, wherein a user in normal operation can change the graphical attributes of one or more of said markers for the first snapshot to display graphical attributes other than those dictated by the set of style rules without the changes applying to the graphical attributes for the one or more markers in the one or more additional snapshots; and
in response to the override option, a user manually changing the graphical attributes of one or more markers for the first snapshot to display graphical attributes other than those dictated by the set of style rules wherein the manual changes are also automatically applied to the one or more markers in the one or more additional snapshots.

* * * * *